US010981289B2

(12) United States Patent
Jakob

(10) Patent No.: US 10,981,289 B2
(45) Date of Patent: Apr. 20, 2021

(54) GUIDE SLEEVE

(71) Applicant: BOXPLAN GMBH & CO. KG, Steisslingen (DE)

(72) Inventor: Tobias Jakob, Radolfzell (DE)

(73) Assignee: BOXPLAN GMBH & CO. KG, Steisslingen (DE)

( * ) Notice: Subject to any disclaimer, the term of this patent is extended or adjusted under 35 U.S.C. 154(b) by 70 days.

(21) Appl. No.: 16/475,233

(22) PCT Filed: Jan. 16, 2018

(86) PCT No.: PCT/EP2018/050923

§ 371 (c)(1),
(2) Date: Jul. 1, 2019

(87) PCT Pub. No.: WO2018/134167

PCT Pub. Date: Jul. 26, 2018

(65) Prior Publication Data

US 2019/0337180 A1 Nov. 7, 2019

(30) Foreign Application Priority Data

Jan. 18, 2017 (DE) ..................... 10 2017 100 874.8

(51) Int. Cl.
*B23Q 1/00* (2006.01)
*B26D 7/18* (2006.01)

(52) U.S. Cl.
CPC ...... *B26D 7/1818* (2013.01); *B26D 2007/189* (2013.01); *B26D 2007/1809* (2013.01)

(58) Field of Classification Search
CPC ....... B23P 11/00; B23P 11/005; B23P 11/027; B23Q 1/00; B23Q 1/25; B23Q 3/00
See application file for complete search history.

(56) References Cited

U.S. PATENT DOCUMENTS 3,529,497 A * 9/1970 Brooks .................. B25B 27/02 81/463
6,293,925 B1 * 9/2001 Safabash .............. A61M 5/158 604/136

(Continued)

FOREIGN PATENT DOCUMENTS

CN 1684780 A 10/2005
CN 201566084 U 9/2010

(Continued)

OTHER PUBLICATIONS

International Search Report issued in related PCT/EP2018/050923, dated May 24, 2018 (4 pages).

(Continued)

*Primary Examiner* — Lee D Wilson
(74) *Attorney, Agent, or Firm* — Bookoff McAndrews, PLLC

(57) ABSTRACT

The invention relates to a guide sleeve for a machine tool for the automated placement of stripping claws, wherein a receiving slot (2) is provided at one end and a solid material base (4) is provided at the other end, and wherein a machine-tool stop (3) is positioned between the receiving slot (2) and the solid material base (4). The guide sleeve is characterised in that the receiving slot (2) is an elongate hole.

12 Claims, 1 Drawing Sheet

(56) References Cited

U.S. PATENT DOCUMENTS

| | | | | |
|---|---|---|---|---|
| 8,925,167 | B1 * | 1/2015 | Miller | B25B 27/023 29/256 |
| 2006/0071062 | A1 | 4/2006 | Weigelt | |
| 2019/0337180 | A1 * | 11/2019 | Jakob | B26D 7/1818 |

FOREIGN PATENT DOCUMENTS

| | | | |
|---|---|---|---|
| CN | 104084975 | A | 10/2014 |
| DE | 4103339 | A1 | 9/1992 |
| DE | 29603683 | U1 | 8/1996 |
| DE | 20 2010 006740 | U1 | 9/2010 |
| DE | 102011050251 | A1 | 11/2011 |
| JP | 2000218595 | A | 8/2000 |
| JP | 3618693 | B2 | 2/2005 |
| WO | 2017/194659 | A1 | 11/2017 |

OTHER PUBLICATIONS

DE Search Report in counterpart German Patent Application No. 10 2017 100 874.8 (3 pages, in German).
CN Office Action in counterpart Chinese Patent Application No. 201880007238.3 (11 pages, in Chinese, with English translation).
CN Search Report in counterpart Chinese Patent Application No. 201880007238.3 (2 pages, in Chinese).

* cited by examiner

GUIDE SLEEVE

CROSS-REFERENCE TO RELATED APPLICATION(S)

This application is a National Stage under 35 U.S.C. § 371 of International Application No. PCT/EP2018/050923, filed on Jan. 16, 2018, which claims priority to German Application No. 10 2017 100 874.8, filed Jan. 18, 2017, the contents of all of which are incorporated by reference in their entirety.

TECHNICAL FIELD

The invention relates to a guide sleeve according to the preamble of claim 1.

BACKGROUND ART

The background art has no such guide sleeves, as the stripping claws according to the background art are hammered manually by personal into the stripping tool to be manufactured

OBJECT OF THE INVENTION

The object of the present invention is to overcome the disadvantages of the background art. In particular, a guide sleeve is to be provided that enables the automated manufacture of stripping tools, wherein not only the already mechanically or automatically used stripping pins are to be introduced to save time, but also the stripping claws, which have previously been introduced manually.

Solution of the Object

The features according to claim 1 lead to the solution of the object.

Advantageous embodiments are described in the dependent claims.

The guide sleeve has a receiving slot on one end and a solid material base on the other end, wherein a machine tool stop is arranged between the receiving slot and the solid material base. The receiving slot is thereby designed as an elongated slot. This has the advantage that received stripping claws can be held in a defined position in the guide sleeve before they can be driven mechanically into the stripping tool to be manufactured for example by a ram. Slipping of the stripping tool in the receiving slot prior to insertion into the stripping tool is successfully prevented.

The receiving slot comprises a stripping claw stop. This has the advantage that the received stripping claw is held in a defined position before it is mechanically inserted into the stripping tool by means of a ram. It is to be prevented that the stripping claw slips too deeply into the guide sleeve.

The receiving slot has a circumferential chamfer in a front outlet area of the guide sleeve. The circumferential chamfer is inclined at an angle of preferably 25 to 35° and more preferably at an angle of 30° with respect to a longitudinally proceeding central axis. It is advantageous here that the stripping claw is guided through the chamfer in a defined area of the receiving slot when loading the guide sleeve through the chamfer.

The receiving slot breaks through an outer wall of the guide sleeve at its longest extension. This is not mandatory. The longest extension describes the two points of an elongated hole that are farthest from each other. Another advantage here is that a broken through outer wall ensures the highest possible flexibility when loading the stripping claw.

A relief slot is present at right angles to the receiving slot. The relief slot and the receiving slot form a plus sign thereby. This arrangement ensures a defined flexibility of the overall arrangement. Furthermore, the outer wall of the guide sleeve breaks through.

The guide sleeve has an inner bore up to the solid material base. In the inner bore, for example, a ram can be provided, which serves for driving out the loaded stripping claw.

Between the machine tool stop and the solid material base, two through bores are present, wherein the two through bores are arranged orthogonally to one another in different planes. In addition, the solid material base has base slots arranged orthogonally to each other, wherein the first base slot extends up to the first through bore and the second base slot extends up to the second through bore. The two base slots have a base chamfer in an end outlet area.

DESCRIPTION OF THE FIGURES

Further advantages, features and details of the invention will become apparent from the following description of preferred exemplary embodiments and by means of the drawings; these show in.

EXEMPLARY EMBODIMENT

Figure 1:
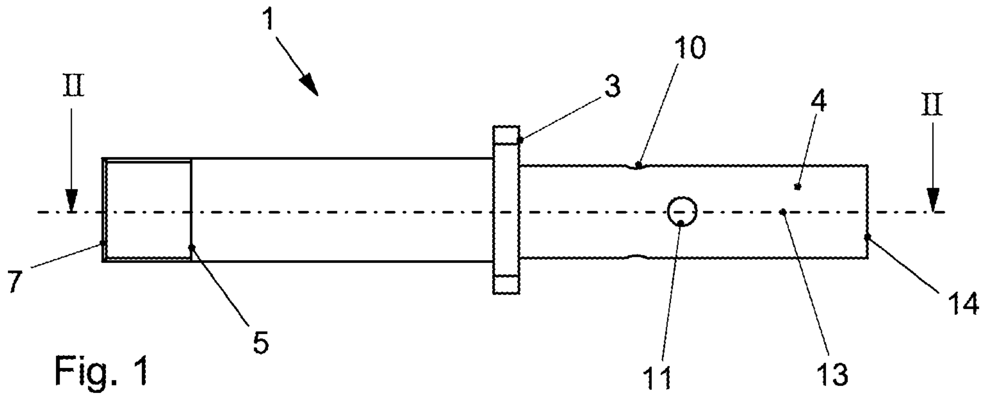
FIG. 1 a side view of a guide sleeve according to the invention.
Figure 2:
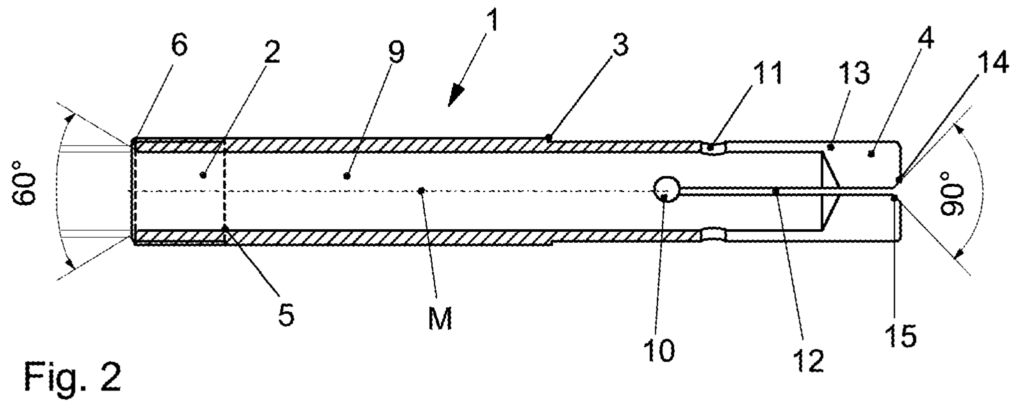
FIG. 2 a sectional view through the guide sleeve in FIG. 1 along the line II-II rotated by 90 degrees.
Figure 3:
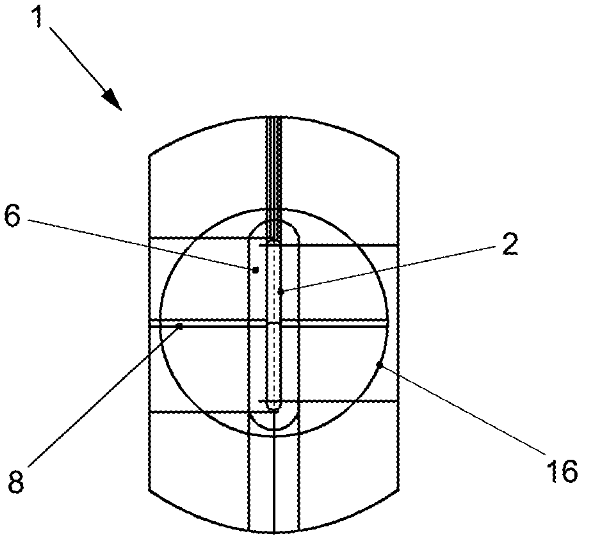
FIG. 3 a plan view of the guide sleeve in FIG. 1.

In FIG. 1, a guide sleeve 1 for a machine tool for the automated setting of stripping claws not shown in detail is illustrated, wherein a receiving slot 2 is present on one end of the guide sleeve 1 and a solid material base 4 is present on the other end.

The receiving slot 2 is formed as an elongated slot and has a circumferential chamfer 6 in a front outlet area 7 of the guide sleeve 1. The circumferential chamfer is inclined at an angle of preferably 25 to 35° and more preferably at an angle of 30° with respect to a longitudinally proceeding central axis M. The receiving slot 2 respectively breaks through an outer wall 16 of the guide sleeve 1 at its longest extension.

A relief slot 8 is present at right angles to the receiving slot 2. The relief slot 8 also breaks through the outer wall 16 of the guide sleeve 1.

The receiving slot 2 comprises a stripping claw stop 5. It is to be prevented thereby that the stripping claw loaded in the guide sleeve slips too deeply into the guide sleeve.

A machine tool stop 3 is arranged between the receiving slot 2 and the solid material base 4.

The guide sleeve 1 has an inner bore 9 up to the solid material base 4. In the inner bore 9, for example, a ram can be provided, not shown in detail, which serves for driving out the loaded stripping claw.

Between the machine tool stop 3 and the solid material base 4, two through bores 10 and 11 are present, wherein the two through bores 10 and 11 are arranged orthogonally to one another in different planes.

The solid material base 4 also has orthogonally arranged base slots 12 and 13. The first base slot 12 extends up to the first through bore 10 and the second base slot 13 extends up to the second through bore 11. The two base slots 12 and 13 have a base chamfer 15 in an end outlet area 14. The base 15 preferably has an angle of 35 to 55° and more preferably an angle of 45° to the central axis M.

Although only a preferred embodiment of the invention has been described and illustrated, it will be apparent that a person skilled in the art can add numerous modifications without departing from the spirit and scope of the invention.

LIST OF REFERENCE NUMERALS

| | |
|---|---|
| 1 | Guide sleeve |
| 2 | Receiving slot |
| 3 | Machine tool stop |
| 4 | Solid material base |
| 5 | Stripping claw stop |
| 6 | Chamber |
| 7 | Front outlet area |
| 8 | Relief slot |
| 9 | Inner bore |
| 10 | Through bore |
| 11 | Through bore |
| 12 | Base slot |
| 13 | Base slot |
| 14 | End outlet area |
| 15 | Base chamfer |
| 16 | Outer wall |
| 17 | |
| 18 | |
| 19 | |
| 20 | |
| 21 | |
| 22 | |
| 23 | |
| 24 | |
| 25 | |
| 26 | |
| 27 | |
| 28 | |
| 29 | |
| 30 | |
| 31 | |
| 32 | |
| 33 | |
| 34 | |
| 35 | |
| 36 | |
| 37 | |
| 38 | |
| 39 | |
| 40 | |
| 41 | |
| 42 | |
| 43 | |
| 44 | |
| 45 | |
| 46 | |
| 47 | |
| 48 | |
| 49 | |
| 50 | |
| 51 | |
| 52 | M Central axis |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | |

The invention claimed is:

1. A guide sleeve for a machine tool for automated setting of stripping claws, the guide sleeve comprising:
   - a receiving slot, the receiving slot being present on a first end of the guide sleeve; and
   - a solid material base, the solid material base being present on a second end of the guide sleeve,
   - wherein a machine tool stop is arranged between the receiving slot and the solid material base,
   - the receiving slot is an elongated hole open to an exterior of the guide sleeve at only a front outlet area of the first end.

2. The guide sleeve of claim 1, wherein the receiving slot includes a stripping claw stop.

3. The guide sleeve of claim 1, wherein the receiving slot has a circumferential chamfer in the front outlet area.

4. The guide sleeve of claim 1, wherein the receiving slot respectively breaks through an outer wall of the guide sleeve at its longest extension.

5. The guide sleeve of claim 1, further comprising a relief slot, the relief slot being present at right angles to the receiving slot.

6. The guide sleeve of claim 5, wherein the relief slot breaks through an outer wall of the guide sleeve.

7. The guide sleeve of claim 1, wherein the guide sleeve has an inner bore up to the solid material base.

8. A guide sleeve for a machine tool for automated setting of stripping claws, the guide sleeve comprising:
   - a receiving slot, the receiving slot being present on a first end of the guide sleeve; and
   - a solid material base, the solid material base being present on a second end of the guide sleeve,
   - wherein a machine tool stop is arranged between the receiving slot and the solid material base,
   - the receiving slot is an elongated hole,
   - two through bores are present between the machine tool stop and the solid material base, and
   - the two through bores are arranged orthogonal to each other in different planes.

9. A guide sleeve for a machine tool for automated setting of stripping claws, the guide sleeve comprising:
   - a receiving slot, the receiving slot being present on a first end of the guide sleeve; and
   - a solid material base, the solid material base being present on a second end of the guide sleeve,
   - wherein a machine tool stop is arranged between the receiving slot and the solid material base,
   - the receiving slot is an elongated hole, and
   - the solid material base has base slots arranged orthogonally to each other.

10. The guide sleeve of claim 9, wherein a first base slot of the base slots extends up to a first through bore, and a second base slot of the base slots extends up to a second through bore.

11. The guide sleeve of claim 9, wherein the two base slots have a base chamfer in an end outlet area.

12. The guide sleeve of claim 1, wherein the elongated hole has an elliptical shape.

* * * * *